Jan. 15, 1935. F. W. CARLSON Re. 19,424

APPARATUS FOR BAKING PIES

Original Filed May 23, 1932

INVENTOR,
FRED W. CARLSON.
BY HIS ATTORNEYS.
Williamson & Williamson

Reissued Jan. 15, 1935 Re. 19,424

UNITED STATES PATENT OFFICE 19,424

APPARATUS FOR BAKING PIES

Fred W. Carlson, Minneapolis, Minn., assignor to Paramount Pies, Inc., St. Paul, Minn., a corporation of Minnesota Original No. 1,970,735, dated August 21, 1934, Serial No. 612,889, May 23, 1932. Application for reissue October 22, 1934, Serial No. 749,462

7 Claims. (Cl. 53—6)

This invention relates to pie baking racks and to processes for baking pies and kindred fruit filled pastries.

Small individual pies are now being extensively used and much difficulty has been experienced by commercial bakers in properly baking these pies and in handling the same during the baking process. In order to bake these pies properly, it is essential that more intense heat be applied to the bottoms and sides of the pies than to the tops of the pies, so that the sides and bottoms of the pies may be browned without burning the tops.

If an even heat is applied to all portions of the pie, the fruit juices forming the center of the pie will boil before the sides and bottom of the pie are properly cooked and, as a result, the pie will boil over or explode before the bottom and side walls can be properly browned. Great difficulty is also experienced in handling these small individual pies in the oven for the reason that the pies are too light to permit the use of an ordinary baker's peel to remove the pies from the oven.

It is, accordingly, an object of the present invention to provide a process for baking pies, whereby more intense heat can be directed against the bottoms and sides of the pies than the tops thereof to cause the bottoms and side walls to be properly browned without at the same time causing the fruit juices of the pies to boil until the bottoms and side walls are properly cooked.

Another object is to provide a novel rack whereby a number of small individual pies may be arranged for proper baking in an oven, and whereby the pies may be collectively supported and conveniently handled when inserted and withdrawn from the oven.

The objects and advantages of the present invention will more fully appear from the following description, made in connection with the accompanying drawing, wherein like reference characters refer to the same or similar parts throughout the various views, and in which—

Figure 1:
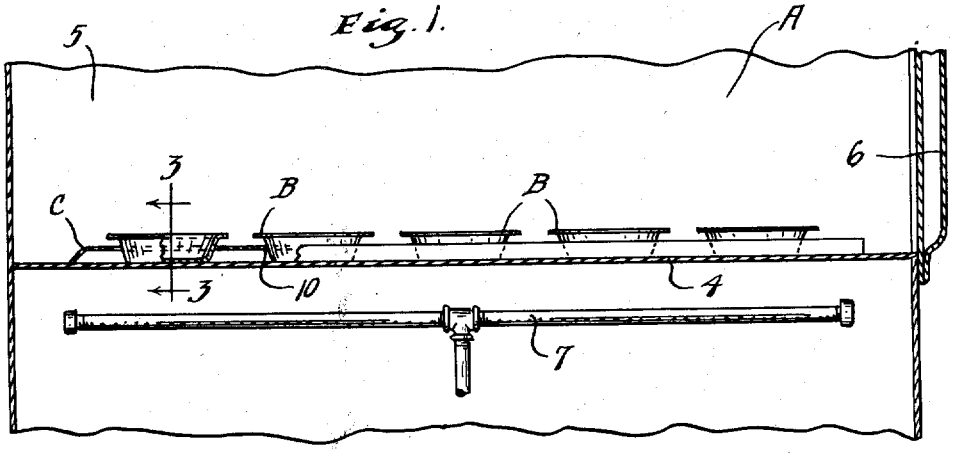
Fig. 1 is a vertical section taken through a portion of a bake oven, and illustrating a number of individual pie pans, as they will appear when arranged in the rack of the present invention after it has been placed in the oven, portions of the rack and of one of the pie pans being broken away to more clearly show the construction thereof.
Figure 2:
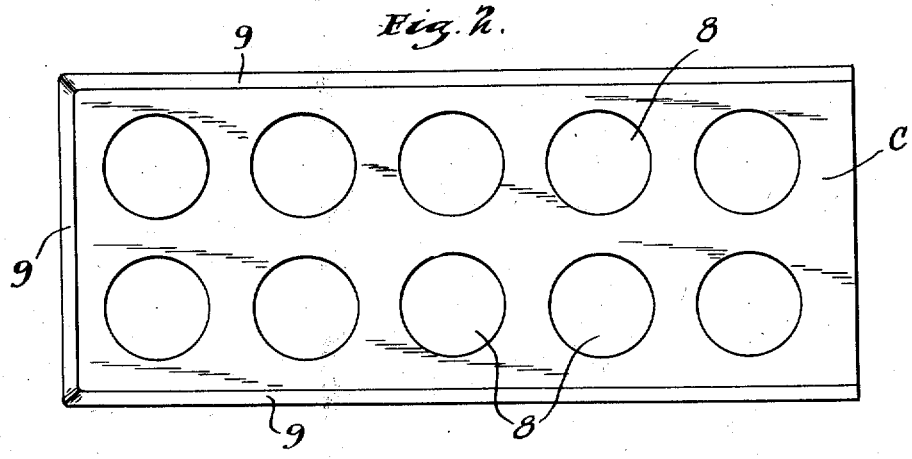
Fig. 2 is a plan view of the rack with the pie tins removed.

Referring to the drawing, portions of an ordinary bake oven A are illustrated which include an oven bottom 4, side and back walls 5, a front door 6 and a burner 7 located below the oven bottom 4. There are also shown a number of pie pans B of the type commonly used in baking small individual pies. Each of the pie pans B includes a bottom, upwardly and outwardly flaring side walls projecting therefrom, and an outturned horizontal flange joining the upper edges of the side walls. The various pies are prepared for baking in the pans B.

Figure 3:
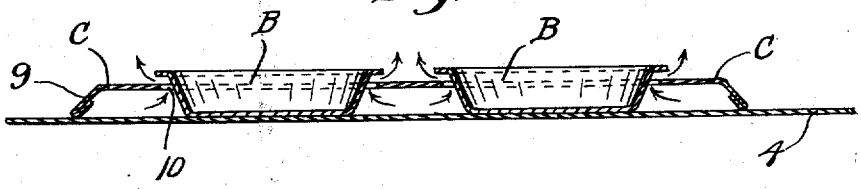
Fig. 3 is an enlarged, vertical section taken on the line 3—3 in Fig. 1, as indicated by the arrows.

In accordance with the present invention, there is provided what may be called a rack C for use in connection with the baking of pies in pie pans B within such an oven as the oven A. This rack C is composed preferably of sheet metal and it has a series of circular openings 8 cut therethrough, these openings preferably being of approximately the same diameter as the diameter of the side walls of the pans B adjacent their upper edges. The rack C has downturned flanges 9 joining the edges of the plate at the sides and rear thereof. If desired, the lower edges of these flanges may be reversely bent upon themselves, as best shown in Fig. 3, to strengthen the same and the flanges preferably are set at an obtuse angle to the main body of the rack C. The flanges 9 are of a height somewhat less than the depth of the side walls of the pie pans B in connection with which the rack C is to be used.

In baking pies, the pies are first prepared for baking in the pie pans B, whereupon the pans are inserted within the apertures 8 of the rack C. A fork having two long tines spaced apart a distance corresponding to the spacing between the two side flanges 9 of the rack is then used for placing the rack C with the pans B therein in the oven. The two tines of the fork are run below the main body of the rack from the front end thereof, whereupon by use of the fork the rack with its contents will be carried to the oven A. The outturned flanges at the upper edges of the side walls of the pans B will prevent the pans from dropping through the openings 8. The rack is placed on the oven bottom 4 so that the lower edges of the flanges 9 rest directly on the oven bottom. As the height of the flanges 9 is somewhat less than the height of the side walls of the pans B, the rack will drop downwardly below the flanges of the pans B, so that the pans will all be supported directly from the oven bottom 4, and small annular spaces 10 will be provided between the side walls of the pans and the rack within the openings 8. The fork will, of course, be withdrawn from the oven after the rack C has been placed therein. Prior to the time that the rack and pans are placed in the oven, the oven will be heated and the rack will form an enclosure about the bottoms and side walls of the pan within which air more intensely heated than the air in the upper portion of the oven will accumulate and be uniformly distributed and applied to the several pans. This intensely heated air will work up through the annular spaces 10 above the pans B from below the flanges thereof without coming into direct contact with the tops of the pies held within the pans. As a result, much more intense heat will be applied to the bottoms and side walls of the pies than to the tops thereof and the side walls and bottoms of the pies will be properly and uniformly cooked to brown the same without heating the fruit juices of the pies to such an extent that the pies will boil over or explode before the side walls and bottoms of the pies are completely cooked. The pies are cooked in this manner until the liquid contents of the pies are heated to near the boiling point, whereupon the side walls and bottoms will be browned and the rack C may then be withdrawn from the oven by use of the fork previously described. The individual pies and the pie pans B within which they are contained, will be simultaneously lifted from the oven and it will not be necessary to use a baker's peel for this purpose.

Should any of the pies be occasionally overcooked so as to result in the escape of fruit juices or other filling, such overflow will not be spilled on the oven hearth, which is difficult to clean, but will be caught on the rack and can be easily cleaned therefrom after the rack has been removed from the oven and the pie tins removed from it, thus resulting in a cleaner and more sanitary condition than would otherwise be the case.

It will be understood that the proper circulation and distribution of heated air in the rack chamber, below the top surfaces of the pies, is an important consideration in the baking process, for without the same the baking process will not be performed in the manner required to obtain satisfactory results. Thus it is necessary to provide openings for the passage or circulation of air both into and out of the rack chamber, for otherwise the rack chamber would form little more than a dead air space, in which event also there would be no tendency to effect a uniform distribution of the intenser heat to the several pie units arranged in spaced relation within the chamber.

As I have already noted, the depending flanges 9 are arranged at only three side edges of the rack plate proper, and is omitted from the fourth edge, i. e., at one end of the plate. This open end allows for the entrance and removal of the rack carrier fork, but also serves the additional purpose of permitting the oven air to circulate into the rack chamber, from which, after becoming more intensely heated, such air rises through the annular passages 10 with a wiping and heat transmitting contact with the side walls of the pans. Thus the side walls of the pans, and also the bottoms which rest on the initially heated oven surface 4, will obviously be heated to a higher degree than the pie tops which are only exposed to the relatively cooler temperature of the oven chamber proper, which condition is of course an important object of the invention to effect.

A further and very important consideration, however, is that this invention provides for a baking process and arrangement that is of commercial value because it enables the baking of pies in groups and with a uniform baking temperature distributed to each unit of the group. Thus a single unit rack chamber might be used for each pie tin, and no doubt a pie could be successfully baked therein. But such a construction would have no practical value in a bakery concern where millions of pies are baked annually; first because the non-uniform temperatures in the non-communicative rack chambers would cause some pies to bake quicker than others; and, secondly, the several units would necessarily have to be placed in and removed from the oven individually by an instrument such as a baker's peel, and this process would not only unduly cool the oven for the unbaked pies, but would also be so slow as to increase the baking costs to a point where such small pies could not be made and sold to any profitable advantage. These objections are entirely overcome by this invention, and the constant circulation of air through my rack chamber produces a uniform distribution of heat to the units of each group, with a result that the pies will be baked uniformly and can be made and sold with a commercial profit.

As an important consideration in the use of the apparatus it may here further be noted that when placed in the oven and during the baking process the rack C, while functioning in the manner stated, has no physical contact with and places no weight or restraint on the pans B, but leaves each to rest on the oven hearth in the same manner as if the rack were entirely removed or omitted. This freedom or clearance permits each pan B to rest by its own weight on the hearth and with freedom for slight tilting when necessary so that its bottom surface will make uniform contact with the hearth surface, thus insuring the absorption of uniform baking temperature by direct conduction from the hearth. In short, by permitting the pans to rest in the hearth as individual units, slight irregularities in either the pan bottom or hearth surfaces will not result in non-uniform contacts nor in some pans being held out of contact, as occurs for instance in so-called muffin tins where the several receptacles are fixed in the rack or plate unit.

The baking process above described and the rack used therewith, has been successfully demonstrated in actual practice and it has been found that pies baked in this manner, are much more delicious and more uniformly and properly cooked than pies cooked without use of the rack C.

It may here also be noted that after the pies have been baked the racks may serve a further useful function in transmitting the pies to and from the cooling racks, and inasmuch as the pies and racks will rest on the cooling shelves in the same manner as in the ovens the racks will in no way interfere with the cooling of the tins by artificial air currents forced into and through the racks.

It will, of course, be understood that various changes may be made in the form, details, arrangement and proportions of the rack C and that changes may be made in the processes described without departure from the scope of the present invention, which, generally stated, consists in the matter shown and described and set forth in the appended claims.

What is claimed is:

1. An apparatus for baking pies in an oven, comprising a series of pie pans having downwardly tapering frusto-conical side walls, and for resting with their bottoms on the oven floor during the baking operation, a rack plate with openings receiving the pie pans and supported on the oven at a level below the tops of the pans to form a shallow heating chamber laterally surrounding the series of pie pans, and such openings being larger than the horizontally adjacent pie pan circumferences so as to leave annular recesses in the plate about the several pans, said chamber having an inlet for receiving oven air to be circulated about the various pans and out through said annular recesses, whereby the sides and bottoms of the pans will be uniformly heated and at a higher degree of temperature than that applied to the top surfaces of the pan contents, and said pans having outwardly projecting flanges at their upper edges for engaging the plate when the latter is lifted, and spaced above the annular recesses, when in baking position, to deflect the hot air current rising through the annular recesses laterally away from the upper surfaces of the pies being baked.

2. An apparatus for baking pies in an oven comprising a rack plate with openings adapted to receive a series of pie pans having downwardly tapering frusto-conical side walls, and for resting with their bottoms on the oven floor during the baking operation, said rack plate being supported on the oven at a level below the tops of the pans to form a shallow heating chamber laterally surrounding the series of pie pans, and such openings being larger than the horizontally adjacent pie pan circumferences so as to leave annular recesses in the plate about the several pans, said chamber having an inlet for receiving oven air to be circulated about the various pans and out through said annular recesses, whereby the sides and bottoms of the pans will be uniformly heated and at a higher degree of temperature than that applied to the top surfaces of the pan contents.

3. A pie baking apparatus of the character described comprising a horizontally disposed rack forming plate having a series of openings, a series of individual pie pans for placement in said openings and having peripheral flanges at their upper edges, said pans while in the rack being adapted to rest on an oven floor in spaced relation to each other during the baking operation, of means for supporting said plate over the oven bottom to form a heating chamber therewith but at a level below the level of the pan flanges so as to leave clearances therebetween when the plate and pans are reposing in operative position in the oven, said openings being sufficiently large to leave an annular recess about the pan walls when the pans are reposing in baking position on the oven bottom, but of lesser circumference than the outer circumferences of the respective pan flanges so that when the rack plate is raised it will close said clearances and annular recesses and lift the pans with it.

4. An apparatus for baking pies in an oven, comprising a rack plate having openings adapted to receive a series of pie pans having flat bottoms, upwardly flared side walls, and peripheral flanges at the upper edges of the side walls, said plate having depending flanges for supporting the same upon the oven floor at a level below the tops of the pie pans, said openings being sufficiently large to permit the pans to extend therethrough and rest upon the oven floor and to leave annular recesses about the pans, said plate and its flanges, when placed upon an oven floor, forming a heating chamber, and said chamber having a laterally disposed inlet opening for admitting air to be circulated about the several pans and upwardly through said annular recesses.

5. An apparatus for baking pies in an oven, comprising a rack plate having openings adapted to receive a series of pie pans having flat bottoms, upwardly flared side walls, and peripheral flanges at the upper sides of the side walls, said plate having depending flanges for supporting the same upon the oven floor at a level below the tops of the pie pans, said openings being sufficiently large to permit the pans to extend therethrough and rest upon the oven floor and to leave annular recesses about the pans, said plate and its flanges, when placed upon an oven floor, forming a heating chamber, and said chamber having a laterally disposed inlet opening for admitting air to be circulated about the several pans and upwardly through said annular recesses, and said peripheral pan flanges being of a width so as to extend outwardly of the annular recesses to engage and be lifted by the plate proper when the latter has been raised from the oven floor.

6. An apparatus of the class described comprising a horizontally disposed rack provided with openings, a series of individual pie pans for placement in paid openings and having flanges at their upper edges and adapted to rest on an oven floor in spaced relation to each other during the baking operation, said rack being supportable on the oven bottom at a level below the level of the pan flanges so as to leave clearance therebetween when the rack and pans are reposing in operative position in the oven, said openings being sufficiently large to leave an annular clearance recess about the pan walls when the pans are reposing in baking position within the rack and on the oven bottom, but of lesser circumference than the outer circumference of the respective pan flanges so that when the rack is raised it will engage the flanges and lift the pans.

7. An apparatus of the character described comprising a horizontally disposed rack frame provided with openings, a series of pie pans for placement in said openings and having flanges at their upper edges, said rack frame being adapted to engage the pans under said flanges to lift the pans into and out of an oven, and said frame being of lesser height than the pans so that when placed in the oven the frame will disengage from the pans and permit the latter to rest on the oven bottom under only their own individual weights and to thereby establish uniform contacts between the bottom surfaces of the pans and the surface of the oven bottom.

FRED W. CARLSON